April 7, 1959 L. C. EBEL ET AL 2,881,243
JACKETED SHEATHED POWER CABLE
Filed July 7, 1953
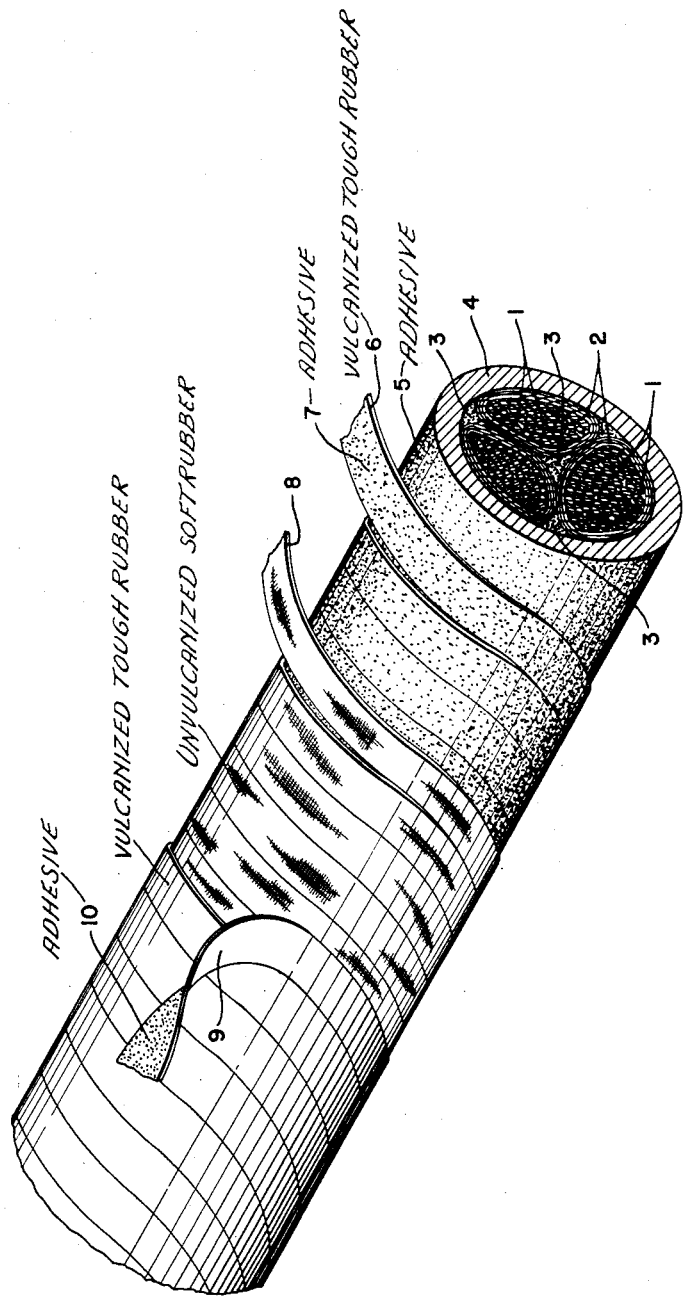
INVENTORS
Lawrence C. Ebel
Ralph G. D'Ascoli
BY
ATTORNEYS

United States Patent Office 2,881,243
Patented Apr. 7, 1959

2,881,243

JACKETED SHEATHED POWER CABLE

Lawrence C. Ebel, Dobbs Ferry, and Ralph G. D'Ascoli, Yonkers, N.Y., assignors to Anaconda Wire and Cable Company, New York, N.Y., a corporation of Delaware Application July 7, 1953, Serial No. 366,514

6 Claims. (Cl. 174—107)

This invention relates to an air- and moisture-impervious protective covering over lead-sheathed power cable and to a method of applying same. The invention provides for applying a plurality of helical layers of rubber tape about lead-sheathed power cable so as to form a unitary protective covering thereabout, enabling such cable to be used over prolonged periods of time in moist and corrosive atmospheres.

Oil-paper insulated, lead-sheathed power cable is commonly used underground, and many attempts have been made to surround the lead sheath of such cable with an airtight and weatherproof coating so as to prevent undue deterioration of the lead sheath and to permit the continued effective use of the cable as an electrical conductor over prolonged periods.

A proposal frequently made heretofore for accomplishing this result has included the step of surrounding the lead sheath with a wrapping of prevulcanized rubber tape. Such tape wrappings, however, are not generally very effective to prevent penetration of moisture through the seams of the wrappings. To meet this difficulty, it has been proposed to apply the tapes prior to vulcanization of the rubber, and then to vulcanize this rubber tape in place on the lead sheath. This is generally accomplished by heating the entire cable to a vulcanization temperature, about 230° F., and to hold the cable at this relatively high temperature for the considerable period required until the vulcanization process is complete. Holding the entire cable at this elevated temperature tends to drive out the oil from the oil-impregnated paper insulation and also causes the lead sheath to expand. Such occurrences result in deterioration of the electrical properties of the cable; and of course the procedure requires considerable time and special processing equipment.

Another scheme commonly proposed to produce a satisfactory protective covering over lead-sheathed power cable involves applying an asphalt-impregnated jute wrapping directly on the lead sheath. Such coverings provide essentially mechanical protection only, and are not effective for long-term protection from moisture penetration.

In accordance with this invention, an air- and moisture-impervious protective covering is formed over lead-sheathed cable, applying over the outer surface of the lead sheath a first butt-lapped helically wrapped layer of a vulcanized tough rubber tape having its outer surface coated with a film of a water-insoluble adhesive. Next, over the adhesive coated surface of the first layer and in overlapped relation with its butt-lapped seam, there is applied a butt-lapped helically wrapped tensile-reinforced soft readily deformable plasticized rubber tape. Then a second butt-lapped helically-wrapped layer of a vulcanized tough rubber tape having its inner surface coated with a film of water-insoluble adhesive is applied over the soft rubber tape layer, in overlapping relation with its butt-lapped seam. Each of the helically-wrapped tapes is applied under substantial tension, whereby the soft readily deformable tape is forced into intimate contact with the adhesive coated surfaces of the first and second vulcanized rubber tape layers, despite minor irregularities of the surface thereof, over substantially their entire areas.

Preferably the water-insoluble adhesive which we employ is of the heat-sensitive or thermoplastic type; that is, it is non-tacky at normal temperatures but becomes adhesive and effectively bonds the layers to which it is applied when heated to a moderately elevated temperature. We may also employ water-insoluble adhesives of the types which are pressure-sensitive (that is, are caused to adhere by being pressed firmly against the surfaces to be joined), and of the type which are solvent-sensitive (that is, are caused to become tacky by being moistened with a solvent), but such adhesives are less preferred than the heat-sensitive type. After (or in the course of) applying the helical layers of rubber tape, the adhesive films are sensitized (as by heating to a moderate temperature if a heat-sensitive adhesive is used) so as to firmly bond the layers into a unitary air- and moisture-impervious protective jacket surrounding the lead sheath.

An advantageous embodiment of a lead-sheathed power cable having a protective jacket according to this invention is shown in the single figure of the accompanying drawing.

Referring to the drawing, the cable shown is of the solid oil-paper insulated type consisting of copper conductors 1, each of which is surrounded by oil-impregnated paper insulation 2. Oil-impregnated jute filler 3 fills the valley spaces between conductors, and the cable thus formed is surrounded by a lead sheath 4. This structure constitutes a standard lead-sheathed power cable.

In forming the air- and moisture-impervious protective covering of this invention on the above-described cable, it is desirable to first apply a normal metal-to-rubber adhesive 5 directly on the outer surface of the lead sheath. This is applied in order to prevent slippage of the cable within the covering and to assist in providing a tight unitary covering. The adhesive may consist of any suitable rubber-to-metal cement, e.g., a phenolic or vinyl resin type adhesive.

Next a helical layer of a vulcanized tough rubber tape 6 is applied directly over the adhesive 5. It is important that the tape 6 form butt-lapped joints, that is, the edges of adjacent convolutions of the tape shall abut each other but should not overlap. The tape 6 should possess the characteristics of durability and toughness commonly associated with a vulcanized rubber, and any good grade of vulcanized rubber will give satisfactory results. However, we have found that neoprene rubber provides especially good results.

The tape 6, on its outer surface, carries a coating of a water-insoluble adhesive 7. An adhesive which is non-tacky at normal temperatures but which becomes tacky and effectively bonds with the rubber at moderately elevated temperatures is especially desirable. Among the heat-sensitive adhesives that may be used with advantage are those having a base of a cellulose ester or a polyvinyl ester. However, any water-insoluble thermoplastic adhesive compositions which, when heated binds to rubber may be used successfully. It is highly desirable that the adhesive selected be capable of establishing a bond without the necessity of holding it at an elevated temperature for a prolonged period of time such as is required in the vulcanization process. Advantageously the adhesive is compounded so that it bonds effectively with the rubber when heated to a temperature less than about 230° F. The heating period should be no longer than is necessary to bring the adhesive to the bonding temperature. A major advantage of the invention lies in the fact that the jacket may be heated locally until the critical bonding temperature of the adhesive is achieved, and may then be cooled before the interior components of the cable are subjected to any injurious heating.

A helical layer of a soft rubber tape 8 is next applied over the adhesive-coated tape 6, again forming butt-lapped joints, and further covering the abutting edges of the tape 6. The tape 8 preferably is a tensile-reinforced, soft, readily deformable, rubber tape. The reinforcing material which may be employed in this tape includes glass fiber, glass mat, cotton, other naturally occurring fibers, synthetic fibers, and fabrics made from such fibers. The rubber employed on tape 8 is preferably an unvulcanized soft rubber having the characteristic that it will conform to any intricacies or irregularities which may occur on the surface of the layers which are applied under it or over it.

A particularly suitable rubber composition for the intermediate tape 8 is a butadiene-acrylonitrile copolymer of the type commonly referred to as "Buna-N" synthetic rubber. We have compounded a suitable soft unvulcanized rubber of a major proportion of butadiene-acrylonitrile copolymer and minor proportions of a stabilizing element and a compatible plasticizer. One especially satisfactory composition is as follows:

|  | Percent |
|---|---|
| Butadiene-acrylonitrile copolymer | 70 |
| Elemental sulfur (stabilizer) | 3 |
| Petroleum hydrocarbon wax (plasticizer) | 17 |

Another type of soft rubber which may be employed in forming the tape 8 is a neoprene synthetic rubber which has been softened with a light processing oil.

A second helical layer of a vulcanized tough rubber tape 9 is then applied directly over the tape 8. This outer tape 9 also is applied with butt-lapped joints, and is laid on so as to cover the abutting joints of the intermediate tape 8. The tape 9 preferably is a tensile reinforced vulcanized rubber tape, similar in composition to the first tape 6. Neoprene rubber has been found to be particularly suitable. The tape 9 further carries a water-insoluble thermosensitive adhesive 10, similar in composition to the adhesive 7, on its under surface, by which it ultimately is bonded to the unvulcanized soft rubber tape 8.

It is particularly desirable that the outer tape 9 be tensile-reinforced and be applied under substantial back-tension, so as to press it firmly against the soft rubber tape 8 and force the latter into intimate contact with the tapes 6 and 9 over their entire surface areas and despite such minor surface irregularities as they may possess. It is in this manner that effective long-lived moisture impermeability is achieved in the protective covering of the invention.

If desired, the outer surface of the protective covering formed by the tapes 6, 8 and 9 may be provided with a slick finish to facilitate the handling, transportation and installation of cable. The slick finish, which is well known to the art, generally consists of an asphaltic base waxy material, over which oftentimes a light coating of a mineral dust is applied. Such finish may be applied directly to the outer surface of the outer protective rubber tape 9, or it may be applied to a fabric or other base which in turn is applied over the outer protective tape 10.

After completing the application of the outer tape 9, the cable is heated sufficiently to sensitize the adhesives 7 and 10 and cause all three layers of tapes 6, 8 and 9 to bond into a unitary, air- and moisture-impervious protective covering. Such heating may be done before applying any outer slick finish, or it may be done simply by immersing the cable in a hot bath of the slick finish compound so that the adhesive is sensitized and the slick finish is applied in a single operation. In either case, however, the heating of the cable is for no longer period and to no higher temperature than is necessary to sensitize the adhesive and cause the tapes 6, 8 and 9 to be intimately bonded together. It is not necessary to heat the entire cable to the adhesive-sensitizing temperature, but only the components of the protective jacket; and the heating should not be continued beyond the time required for adhesive sensitizing purposes. Thus heating of the cable to a temperature and for a period of time that might cause injury to the electrical properties of the cable is readily avoided. Also, since no prolonged heating is required and since the heating step may be combined with the step of applying a slick finish, the heating and slick-finishing operation may be combined into a continuous-type, as distinguished from batch-type, operation, with consequent manufacturing economies.

It is evident from the foregoing that the invention provides an air- and moisture-impervious protective covering for lead sheathed cables, which is capable of effectively protecting the lead from corrosion and other damaging effects of the elements to which it would otherwise be exposed in its operation, and that by the method of the invention such covering is provided without incurring any risk of adversely affecting the electrical properties of the cable.

We claim:

1. The method of applying an air- and moisture-impervious protective covering over lead-sheathed cable which comprises the steps of applying over the outer surface of the lead sheath a first butt-lapped helically wrapped layer of a vulcanized tough rubber tape having its outer surface coated with a film of water-insoluble adhesive, then applying over said adhesive-coated surface, in overlapped relation with the butt-lapped seam of said first layer, a butt-lapped helically wrapped layer of tensile-reinforced soft readily deformable plasticized rubber tape, then applying over said soft rubber tape layer, in overlapping relation over the butt-lapped seam thereof, a second butt-lapped helically wrapped layer of a vulcanized tough rubber tape having its inner surface coated with a film of water-insoluble adhesive, each of said helically wrapped tapes being applied under substantial tension, whereby said soft readily deformable tape is forced into intimate contact with the adhesive-coated surfaces of the first and second vulcanized rubber tape layers, despite minor irregularities of said surface, over substantially the entire area thereof, and sensitizing said adhesive films, whereby said layers are intimately bonded into a unitary air- and moisture-impervious protective jacket surrounding the lead sheath.

2. The method of applying an air- and moisture-impervious protective covering over lead-sheathed cable which comprises the steps of applying over the outer surface of the lead sheath a first butt-lapped helically wrapped layer of vulcanized tough rubber tape having its outer surface coated with a film of water insoluble heat-responsive adhesive, then applying over said adhesive-coated surface, in overlapped relation with the butt-lapped seam of said first layer, a butt-lapped helically wrapped layer of tensile-reinforced soft readily deformable plasticized rubber tape, then applying over said soft rubber tape layer, in overlapping relation over the butt-lapped seam thereof, a second butt-lapped helically wrapped layer of a vulcanized tough rubber tape having its inner surface coated with a film of water insoluble heat-responsive adhesive, each of said helically wrapped tapes being applied under substantial tension, whereby said soft readily-deformable tape is forced into intimate contact with the adhesive-coated surfaces of the first and second vulcanized rubber tape layers, despite minor irregularities of said surfaces, over substantially the entire areas thereof, and heating the thus wrapped cable only to the extent necessary to activate said adhesive coatings, whereby said heat-responsive adhesives are set and said layers are intimately bonded into a unitary air- and moisture-impervious protective jacket surrounding the lead sheath.

3. The method of applying an air- and moisture-impervious protective covering over lead-sheathed cable which comprises the steps of applying over the outer surface of the lead sheath a first butt-lapped helically wrapped layer of vulcanized neoprene rubber tape having its outer surface coated with a film of water insoluble heat-responsive adhesive, then applying over said adhesive-coated surface, in over-lapped relation with the butt-lapped seam of said first layer, a butt-lapped helically wrapped layer of tensile-reinforced soft rubber tape comprising a major proportion of a butadiene-acrylonitrile copolymer and a minor proportion of petroleum hydrocarbon wax, then applying over said soft rubber tape layer, in overlapping relation over the butt-lapped seam thereof, a second butt-lapped helically wrapped layer of a vulcanized tough rubber tape having its inner surface coated with a film of water insoluble heat-responsive adhesive, each of said helically wrapped tapes being applied under substantial tension, whereby said soft readily-deformable tape is forced into intimate contact with the adhesive-coated surfaces of the first and second vulcanized rubber tape layers, despite minor irregularities of said surfaces, over substantially the entire areas thereof, and heating the thus wrapped cable only to the extent necessary to activate said adhesive coatings, whereby said heat-responsive adhesives are set and said layers are intimately bonded into a unitary air- and moisture-impervious protective jacket surrounding the lead sheath.

4. A lead-sheathed cable having an air- and moisture-impervious protective covering applied over the outer surface of the lead sheath, said covering comprising a first butt-lapped helically wrapped layer of a vulcanized tough rubber tape having its outer surface coated with a film of water-insoluble adhesive, a butt-lapped helically wrapped layer of tensile-reinforced soft readily deformable plasticized rubber tape applied over said adhesive-coated surface in overlapped relation with the butt-lapped seams of said first layer, a second butt-lapped helically wrapped layer of a vulcanized tough rubber tape applied over said soft rubber tape layer in overlapping relation with the butt-lapped seam thereof, the inner surface of said second layer of vulcanized tough rubber being coated with a film of water-insoluble adhesive, each of said helically wrapped tapes being under substantial tension, whereby said soft readily deformable tape is in intimate contact with the adhesive-coated surfaces of said first and second vulcanized rubber tape layers, despite minor irregularities of said surfaces, over substantially the entire areas thereof, said adhesive films intimately bonding said layers into a unitary air- and moisture-impervious protective jacket surrounding the lead sheath.

5. A lead-sheathed cable having an air- and moisture-impervious protective covering applied over the outer surface of the lead sheath, said covering comprising a metal-to-rubber adhesive applied directly on said lead sheath, a first butt-lapped helically wrapped layer of vulcanized tough rubber tape having its outer surface coated with a film of water-insoluble adhesive, a butt-lapped helically wrapped layer of tensile-reinforced soft readily deformable plasticized rubber tape applied over said adhesive-coated surface in overlapped relation with the butt-lapped seams of said first layer, a second butt-lapped helically wrapped layer of a vulcanized tough rubber tape applied over said soft rubber tape layer in overlapping relation with the butt-lapped seam thereof, the inner surface of said second layer being coated with a film of water-insoluble adhesive, each of said helically wrapped tapes being under substantial tension, whereby said soft readily deformable tape is in intimate contact with the adhesive-coated surfaces of said first and second vulcanized rubber tape layers, despite minor irregularities of said surfaces, over substantially the entire areas thereof, said adhesive films intimately bonding said layers into a unitary air- and moisture-impervious protective jacket surrounding the lead sheath.

6. A lead-sheathed cable having an air- and moisture-impervious protective covering applied over the outer surface of the lead sheath, said covering comprising a first butt-lapped helically wrapped layer of vulcanized neoprene rubber tape having its outer surface coated with a film of water insoluble adhesive, a butt-lapped helically wrapped layer of tensile-reinforced soft rubber tape comprising a major proportion of a butadiene-acrylonitrile copolymer and a minor proportion of a petroleum hydrocarbon wax, said soft rubber tape being applied over said adhesive coated surface in overlapped relation with the butt-wrapped seams of said first layer, a second butt-lapped helically wrapped layer of a vulcanized neoprene rubber tape applied over said soft rubber tape layer in overlapping relation with the butt-lapped seam thereof, the inner surface of said second layer being coated with a film of water insoluble adhesive, each of said helically wrapped tapes being under substantial tension, whereby said soft readily deformable tape is in inimate contact with the adhesive-coated surfaces of the first and second vulcanized rubber tape layers, despite minor irregularities of said surfaces, over substantially the entire areas thereof, said adhesive films intimately bonding said layers into a unitary air- and moisture-impervious protective jacket surrounding the lead sheath.

References Cited in the file of this patent

UNITED STATES PATENTS

| | | |
|---|---|---|
| 271,750 | Thomas | Feb. 6, 1883 |
| 1,287,658 | Evans | Dec. 17, 1918 |
| 2,003,991 | Carlson | June 4, 1935 |
| 2,093,411 | Bowden | Sept. 21, 1937 |
| 2,299,140 | Hanson | Oct. 20, 1942 |
| 2,433,081 | Wilkoff | Dec. 23, 1947 |